United States Patent
Roth et al.

(10) Patent No.: US 7,677,098 B2
(45) Date of Patent: Mar. 16, 2010

(54) LIGHT SENSING CONTACTLESS FUEL LEVEL SENSOR

(75) Inventors: Robert A. Roth, El Paso, TX (US); Steven Aikman, El Paso, TX (US)

(73) Assignee: Delphi Technologies, Inc., Troy, MI (US)

( * ) Notice: Subject to any disclaimer, the term of this patent is extended or adjusted under 35 U.S.C. 154(b) by 237 days.

(21) Appl. No.: 11/835,826

(22) Filed: Aug. 8, 2007

(65) Prior Publication Data

US 2009/0038395 A1     Feb. 12, 2009

(51) Int. Cl.
G01F 23/32     (2006.01)
G01F 23/00     (2006.01)

(52) U.S. Cl. .......................................... 73/317; 73/313
(58) Field of Classification Search .................... 73/317, 73/313, 322.5
See application file for complete search history.

(56) References Cited

U.S. PATENT DOCUMENTS 3,316,763 A * 5/1967 De Giers ..................... 73/317

(Continued)

FOREIGN PATENT DOCUMENTS

EP          0058056          8/1982

(Continued)

OTHER PUBLICATIONS

SAE Technical Paper Series, 2002-01-1074, "Design Guidelines for Automotive Fuel Level Sensors," E.F. Smith, III and Hugh W. Ireland, Reprinted from: Sensors and Actuators 2002 (SP-1659), SAE 2002 World Congress, Detroit, Michigan, Mar. 4-7, 2002.

(Continued)

Primary Examiner—Hezron Williams
Assistant Examiner—Nathaniel Kolb
(74) Attorney, Agent, or Firm—Thomas N. Twomey (57) ABSTRACT

A contactless, sealed fuel level sensor for determining a fuel level in a fuel tank and producing a level indicative signal includes a frame, a cover, a float arm, a float and a light-responsive sensor. The frame is configured to have a cavity formed therein. The cover is connected to the frame to enclose the cavity. The float arm is coupled to one of the frame or cover. The float is connected to the float arm and configured such that the float moves the float arm as a level of fuel increases and decreases in the fuel tank. The light-responsive sensor is configured to generate a fuel level signal indicative of a fuel level in the fuel tank based on the movement of the float arm. The fuel level sensor may also include a light source such as a light emitting diode (LED). The light-responsive sensor may be a single photoelectric sensor located in the sealed cavity, or an array of photoelectric sensors located in the sealed cavity. The fuel level sensor may also include a rotatable hub connected to the float arm for movement as the arm moves and where rotation of the hub varies an amount of light impinging on the photoelectric sensor. The light responsive sensor may also include a CMOS sensor located in the sealed cavity. The light responsive sensor may also include a digital, optical-based displacement encoder mounted on the float arm used in combination with a rotary scale applied to the cover opposite the encoder.

7 Claims, 4 Drawing Sheets

U.S. PATENT DOCUMENTS

| | | |
|---|---|---|
| 6,336,362 B1 | 1/2002 | Duenas |
| 6,681,628 B2 | 1/2004 | Sawert et al. |
| 6,966,306 B2 | 11/2005 | Sawert et al. |
| 7,062,966 B1 | 6/2006 | Davila |
| 7,155,349 B1 | 12/2006 | Souluer |
| 2003/0041665 A1* | 3/2003 | Arias .......................... 73/317 |
| 2005/0103103 A1* | 5/2005 | Newman et al. .............. 73/313 |
| 2006/0042379 A1 | 3/2006 | Ireland et al. |

FOREIGN PATENT DOCUMENTS

| | | |
|---|---|---|
| JP | 57203914 | 12/1982 |
| WO | 03/021198 | 3/2003 |

OTHER PUBLICATIONS

MicroE Systems Inf Sheet "Mercury II, The Next Generation of High-Performance Encoders,"Copyright 2007 MicroE Systems.

GSI MicroE Systems Info Sheet "Mercury Encoder Technology—Smaller, Faster, Smarter High-Performance Encoders," Copyright 2007 MicroE Systems.

EP Search Report dated Nov. 3, 2008.

* cited by examiner

*Fig. 13*

# LIGHT SENSING CONTACTLESS FUEL LEVEL SENSOR

TECHNICAL FIELD

The present invention relates generally to improvements in fuel sensors for vehicles and more particularly to a light sensing contactless fuel level sensor for a vehicle.

BACKGROUND OF THE INVENTION

It is known to provide a fuel level sensor in a fuel tank of a vehicle to sense or indicate a level of fuel in the fuel tank. One type includes a float connected to an arm that moves an electrical contact, changing resistance in response to fuel height. The fuel level sensor may include a ceramic resistor card operatively connected to a structure for a fuel module and a wiper assembly pivotally connected to the structure for engaging the resistor card. The wiper assembly has one end connected to a float arm and float to rotate the wiper assembly relative to the resistor card based on a level of fuel in the fuel tank.

In this regard, one type of such a fuel level sensor employs thick film ceramic fuel level sensors that are open and exposed to fuel in the fuel tank. These fuel level sensors typically employ silver (Ag) based conductive inks (Ag, Pd, Pt) and high content Ag contacts. These materials function properly in fuels that contain moderate sulfur levels or that are low in alcohol content. These materials have also allowed manufacturers to produce a cost effective fuel level sensor.

Fuel level sensors that are open and exposed to fuels have, however, been susceptible to solid contaminates, for example sand, which can cause the sensor output to produce opens. As sulfur levels in fuels are reduced, what remains are smaller, more reactive compounds. Sulfination is a chemical reaction between Ag and sulfur. Natural aging of the ink/contact interfaces of the fuel level sensor exposes the silver in these components to sulfurs, producing a thin lacquer contamination. Silver based fuel level sensors produce opens or a shift in resistance when exposed to this extremely reactive fuel.

Also, as refineries introduce fuels with higher levels of alcohol, silver based fuel level sensors that are open or exposed to this fuel are more susceptible to plating, galvanic, or dendritic growth. Accordingly, this type of float-based fuel level sensor is subject to not only mechanical wear through abrasion but to fuel contamination as well, and must be sealed somehow for use in aggressive fuels (e.g., higher levels of alcohol and/or sulfur).

One approach taken in the art involves providing a sealed cavity for housing and protecting the variable resistor from the influences of aggressive fuels and contaminants, as seen by reference to U.S. Patent Application Publication No. US 2006/0042379 A1 entitled "SEALED FUEL LEVEL SENSOR" to Ireland et al., owned by the common assignee of the present invention. This wiper-type fuel level sensor may nonetheless be subject to mechanical wear.

Another type of fuel level sensor employs any of several schemes to measure fuel level without moving components, such a through the use of dielectrics or ultrasound measurement. This type of sensor involves the use of conductive inks screened onto relatively long substrates, in the case of the dielectric units, and includes complex transmitters and receivers in the case of ultrasonics. Both of these units have complex electronics that have to be packaged outside the fuel tank, or provided in a sealed enclosure for use in the fuel tank to operate properly.

There is therefore a need for an improved fuel level sensor that minimizes or eliminates one or more of the problems set forth above.

SUMMARY OF THE INVENTION

One advantage of the present invention is that it provides a relatively inexpensive fuel level sensor that is robust against the adverse effects of aggressive fuels (e.g., those containing increased levels of alcohol and/or sulfur). This is due to the sensitive components being protected in a sealed cavity. Additionally, another advantage is that this fuel level sensor is not subject to wear since it is contactless. A sealed contactless fuel level sensor comprises a frame, a cover, a float arm, a float and a light-responsive sensor.

The frame has a cavity. The cover is connected to the frame so as to enclose the cavity. In effect, the cavity is sealed and protected against outside influences, such as aggressive fuels. The float arm is coupled to one of the frame or the cover. The float is connected to the float arm and is configured such that the float moves the float arm as a level of fuel increases and decreases in the fuel tank. The light-responsive sensor is configured to generate a fuel level signal indicative of a fuel level in the fuel tank, based on the movement of the float arm. Since the sensor is light responsive, it is contactless, and hence is not subject to mechanical wear and deterioration.

In a first embodiment, the fuel level sensor includes a light source, such as a light emitting diode (LED), coupled to the float arm for movement therewith along a predefined path. The cover comprises translucent material configured to allow light emitted from the LED to enter the cavity. The light-responsive sensor includes a photoelectric sensor disposed in the cavity and arranged to receive light from the LED. The received light has an intensity that is variable as a function of the float arm movement as it moves the LED along the LED path.

In a second embodiment, a plurality of photoelectric sensors are arranged in the cavity in an array that provides light-receiving coverage in correspondence with the LED path. Alternatively, an optical fiber may be included on an interior surface of the cover, and match the LED path, to channel light.

In a third embodiment, the cover includes a guide channel for the LED, which allows the LED to be closer to the sensor in the cavity (and thus brighter).

In a fourth embodiment, a novel rotating hub is employed to house the light source and to secure the float arm. The hub contains a triangular window to modulate the light that is permitted to reach the sensor, all as a function of the float arm.

In a fifth embodiment, a novel rotating hub has optically-readable indicia formed thereon, which is used in combination with a sealed-cavity mounted light source and a CMOS sensor. As the hub rotates, the CMOS sensor "reads" the modulations in the light, due to the markings, and develops a signal indicative of such rotation, which can be used to generate a fuel level signal.

In a sixth embodiment, an optical digital displacement encoder is used to measure the movement of the float arm (and hence full level).

Other features and aspects of the invention are also presented.

BRIEF DESCRIPTION OF THE DRAWINGS

The present invention will now be described by way of example, with reference to the accompanying drawings.

DETAILED DESCRIPTION OF THE PREFERRED EMBODIMENTS

Figure 1:
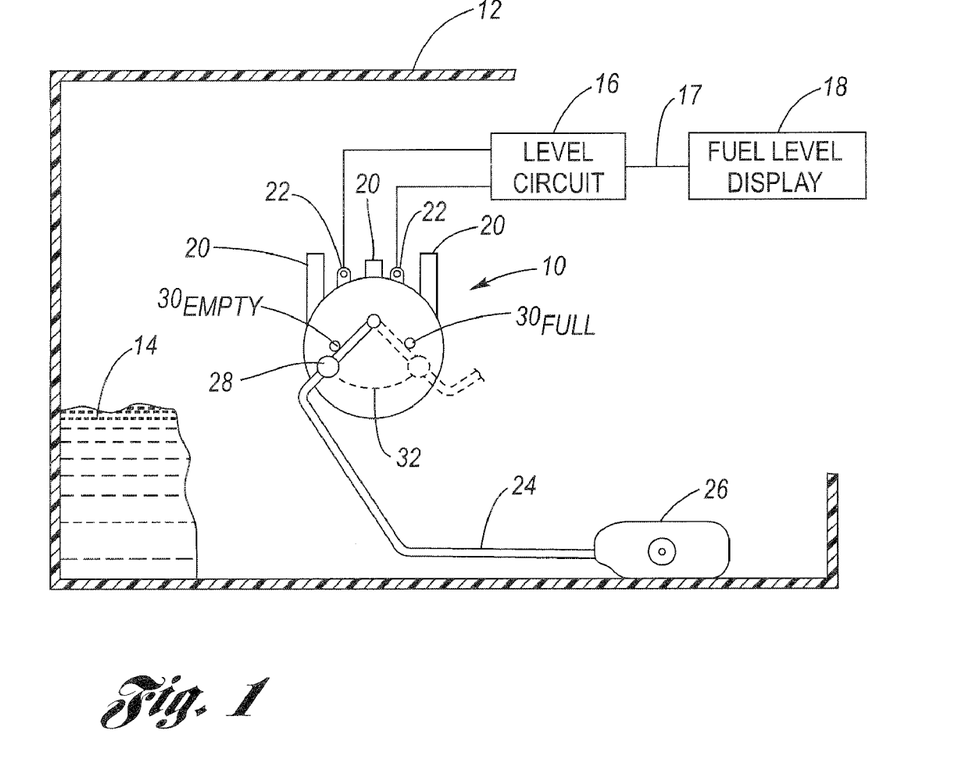
FIG. 1 is a fragmentary elevation view of a light-sensing sealed contactless fuel level sensor according to the present invention, illustrated in a preferred environment (i.e. as deployed in a fuel tank).

FIG. 1 is a fragmentary, elevation view of a light sensing, sealed, contactless fuel level sensor 10 according to the present invention, illustrated in a preferred environment (i.e. as deployed in a fuel tank 12 of a vehicle (not shown)). The fuel level sensor 10 is configured to detect a fuel level 14, and may be electrically coupled to a level circuit 16 that is configured to interact with fuel level sensor 10 to generate a fuel level signal 17 indicative of the fuel level 14 of the fuel in the tank 12. It should be understood that level circuit 16 may be external to fuel level sensor 10 (as shown), or may be incorporated directly into the body of sensor 10 (i.e., internally disposed). In either case, fuel level signal 17 may optionally be provided to a display 18, as known in the art, for display to an operator of a vehicle (not shown) in which the fuel level sensor is used. As further shown, fuel level sensor 10 may include a pair of mounting arms 20 spaced laterally apart and configured for securing fuel level sensor 10 in fuel tank 12. FIG. 1 also shows a pair of electrical terminals 22 configured to provide an electrical interface between circuit 16 and sensor 10 (or between fuel level sensor 10 and a display or other "reader" if level circuit is internally incorporated into the body of sensor 10).

Fuel level sensor 10 may further include a float arm 24, a float 26, and in the illustrated first embodiment, a light source 28. Sensor 10 may also include a pair of mechanical stops, designated $30_{FULL}$ and $30_{EMPTY}$.

Float arm 24 is preferably connected to the main body of sensor 10 (i.e., frame and cover, described below) for pivotal movement. Float arm 24 may comprise metal material, for example a plated cold rolled steel. Float arm 24 is a rod that is bent with one end disposed in float 26 and the other end disposed in the main body of sensor 10. Float 26 may be generally rectangular in shape, although other shapes are possible, particularly in adaptation to unique fuel tank shapes, or other criteria. Float 26 may be made from suitable material and constructed so as to float in the fuel (i.e., has a density that is less than the fuel). As described, float arm 24 is configured for pivotal movement, and is shown in FIG. 1, in solid line, in an empty fuel position (i.e., where the float arm 24 abuts mechanical stop $30_{EMPTY}$), which corresponds to a no or low fuel level. As the fuel level in the tank increases, float 26 moves generally upwardly (in FIG. 1), causing float arm 24 to move in a pivotal motion from the empty fuel position to the full fuel position (i.e., where float arm 24 abuts mechanical stop $30_{FULL}$). During this pivoting motion, light source 28 moves along a path, indicated in dashed-line format in FIG. 1 designated by reference numeral 32. In general terms, embodiments of the invention all include a light-responsive sensor configured to generate a fuel level signal indicative of fuel level in the fuel tank based on the movement of float arm 24. A fuel level sensor 10 in accordance with the invention may be practiced by reference to the general knowledge of one of ordinary skill in the art, for example as seen by reference to U.S. Patent Publication No. 2006/0042379 A1 entitled SEALED FUEL LEVEL SENSOR, owned by the common assignee of the present invention, and hereby incorporated by reference herein in its entirety, in combination with the enabling disclosure herein.

Figure 2:
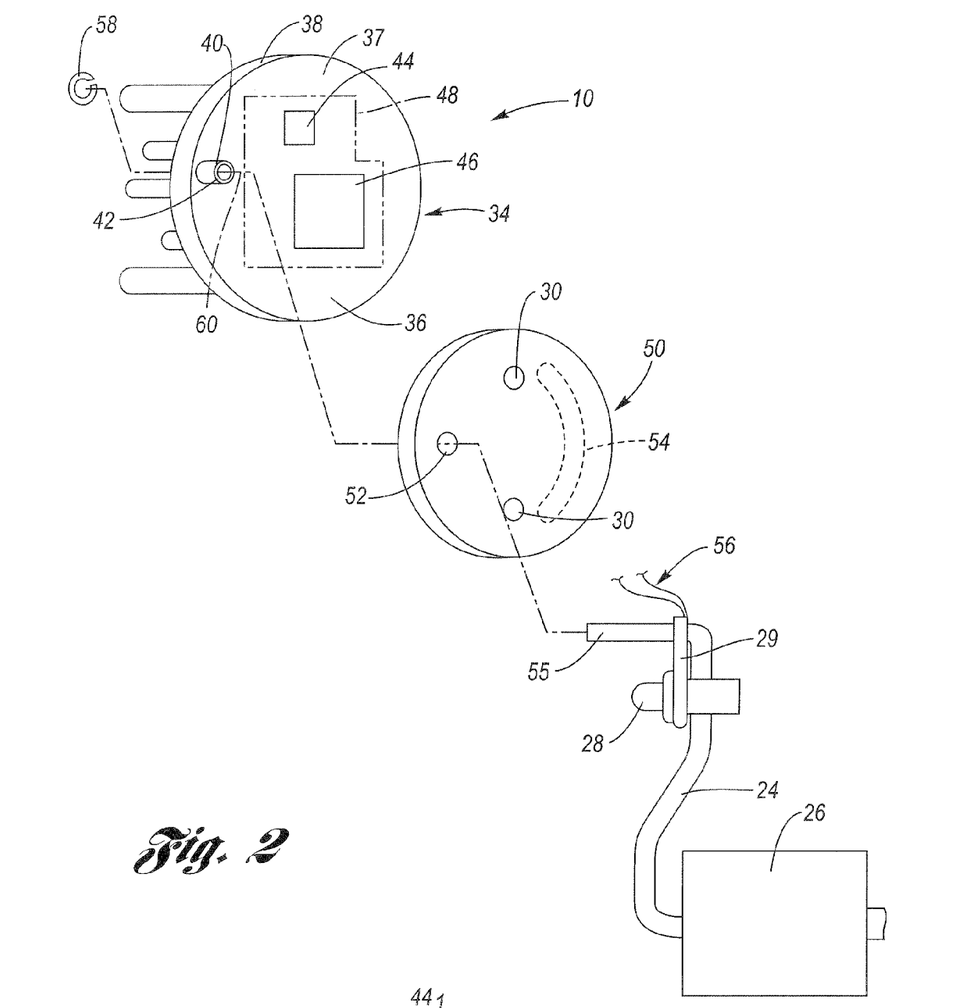
FIG. 2 is an enlarged, exploded view of a first embodiment of a fuel level sensor according to the invention, using a light-responsive photoelectric sensor protected in a sealed cavity.

FIG. 2 is an enlarged, exploded view of the first embodiment of a contactless fuel level sensor according to the invention, using a photoelectric sensor protected in a sealed cavity. Fuel level sensor 10 includes a number of component parts, including a frame 34. Frame 34 is configured generally for allowing fuel level sensor 10 to be mounted within fuel tank 12. In this regard, the above-described mounting arms 20 may be formed as part of frame 34. Frame 34 further includes a cavity 36 that is defined by a base wall 37 and a sidewall 38 that may be generally perpendicular to base wall 37, or other known configurations to provide a cavity. In the illustrated embodiment, base wall 37 is generally planar and circular in shape, while sidewall 38 is generally annular. Accordingly, cavity 36 is somewhat circular in shape as well. Frame 34 further includes a boss 40 integral with and projecting from base wall 37, and which in the illustrated embodiment is cylindrical in shape. Boss 40 includes a cylindrical throughbore 42 for a purpose to be described below.

Fuel level sensor 10 further includes a light-responsive sensor configured to generate a fuel level signal indicative of a fuel level based on the movement of float arm 24. In the first embodiment, illustrated in FIG. 2, the light-responsive sensor comprises a photoelectric sensor 44. Sensor 44 is configured to generate an output signal that is variable in accordance with a light intensity impinging on a light receptor portion thereof. Sensor 44 may comprise any of a wide variety of such sensors known to those of ordinary skill in the art. Fuel level sensor 10 may also contain, optionally, processing circuitry 46 coupled to photoelectric sensor 44, to condition the photoelectric sensor 44 output signal. Processing circuitry, for example, may include the level circuit 16 described above. Photoelectric sensor 44, and optional processing circuitry 46 (if present) may be deployed on a circuit board 48, shown in phantom line format in FIG. 2. Frame 34 may comprise plastic material, and may more preferably be formed as a unitary structure.

Fuel level sensor 10 further includes a cover 50 configured to be connected to frame 34 to enclose cavity 36 of frame 34. Cover 50 has a generally circular shape and includes an interior surface (facing cavity 36 when assembled) and an exterior surface opposite the interior surface. Cover 50 is configured generally in size and shape to cooperate with the size and shape of the sidewall 38 of frame 34 to effect the enclosure of cavity 36. Cover 50 includes, in the illustrated embodiment, an aperture 52 that is configured to allow boss 40 to be disposed therethrough. As shown, boss 40 is configured to project through cavity 36 towards cover 50. The height of boss 40 is selected, in view of the configuration of sidewall 38, such that a topmost surface of boss 40 is substantially flush with, or alternatively, just slightly extending beyond, the exterior surface of cover 50. Cover 50 may further include one or more projections defining the mechanical stops 30 described above. Cover 50, in the first embodiment, comprises light transmissive, clear or light translucent, fuel resistant plastic material. In one embodiment, cover 50 comprises plastic material commercially available under the trade designation Polyamide 5033 HST-Polyamide 66. Polyamide 5033 HST by Nycoa (Nylon Corporation of America, Manchester, N.H., USA) is a 33% glass fiber reinforced, heat stabilized, translucent Nylon 66 (Polyamide 66) resin suitable for injection molding, having excellent chemical resistance to most greases, oils and other hydrocarbons, high thermal resistance and translucency. It should be understood that other suitable materials, known in the art, may also be used. Cover 50 is preferably welded to frame 34, thereby providing protection for the sensor 44 by sealing it inside the fuel level sensor body defined by the combination of frame 34 and cover 50. This welding process not only involves welding around the circular perimeter where the cover meets the frame, but also where the boss 40 meets the cover 50.

Cover 50 may alternatively include, in a variation, a fiber optic strand 54 disposed on an interior surface of cover 50 facing the cavity 36 and placed in registration with the LED path 32. The fiber optic strand 54 is configured to carry light from the LED 28 to photoelectric sensor 44.

FIG. 2 further shows the float assembly portion of fuel level sensor 10 comprising arm 24 and float 26. A proximal portion 55 of float arm 24 is configured for insertion in through-bore 42. The diameter of the proximal portion 55 is slightly less than the diameter of through-bore 42 so as to permit a controlled (i.e., relatively small and acceptable level of wobble) rotation therein.

FIG. 2 also shows light source 28, which comprises, in one embodiment, a single light emitting diode (LED) 28, with an included lens molded in translucent or clear, fuel-resistant plastic, as described above in connection with cover 50. For an embodiment where an increased amount of light (i.e., an increased light intensity level) is needed or desired, light source 28 may comprise a plurality of light sources, such as an arranged cluster of LEDs. In either case, the LED 28 (or cluster, as the case may be) is attached to float arm 24 by way of a mounting bracket 29. As shown, bracket 29 may include at least two points of coupling with float arm 24. LED 28 further includes electrical leads 56, as known, to provide energization power to LED 28. Leads 56 may be terminated elsewhere on frame 34 (e.g., proximate terminals 22), or may alternatively be routed externally (e.g., to level circuit 16 when it is external). One of ordinary skill in the art will recognize the many possible variations.

The length of proximal portion 55 of float arm 24 is selected such that it extends through-bore 42 beyond the rear surface of frame 34. A retention element, such as a pall nut or push washer 58, is configured to slip over the free end of the proximal part 55 of float arm 24, thereby retaining it within through-bore 42. So configured, float arm 24 can rotate within through-bore 42 about axis 60, subject to mechanical stops 30.

With continued reference to FIG. 2, in operation, float 26 moves generally up or down in relation to increases and decreases of the fuel level 14 of the fuel in the fuel tank 12. These movements of float 26 in turn cause float arm 24 to move in a corresponding fashion. Due to the various bends in arm 24, and that proximal portion 55 is pinned in bore 42, portion 55 moves in a pivotal motion. The LED 28, being fixed to arm 24, also moves therewith, with a source point of illumination moving substantially along path 32, for example.

In concept, as the LED 28 moves along path 32, the source point of illumination is moved either closer to or farther away from photoelectric sensor 44, wherein the light intensity impinging on sensor 44 is variable as a function the float arm movement (and hence also variable as a function of the fuel level). The electrical output of photoelectric sensor 44 is also variable as a function of light intensity, and thus also variable in accordance with the fuel level. In one embodiment, when the fuel level 14 is at a "Full" level, LED 28 would be positioned directly over photoelectric sensor 44, which is protected in sealed cavity 36, so as to allow for the maximum light intensity to impinge on sensor 44 and thus generate the maximum electrical output signal from sensor 44. As the fuel level 14 drops in the fuel tank 12, the LED 28 moves away, substantially along path 32, from sensor 44, thereby decreasing the light intensity reaching sensor 44, thus also causing the electrical output from sensor 44 to drop correspondingly. As described above, in an alternative variation of this first embodiment, fiber optic strand 54 may be included on an interior surface of cover 50 (facing cavity 36), configured to transmit light back to the photoelectric sensor 44. As also described above, if conditioning electronics/circuitry 46 are needed or desired, they can also be provided in sealed cavity 36.

Figure 3:
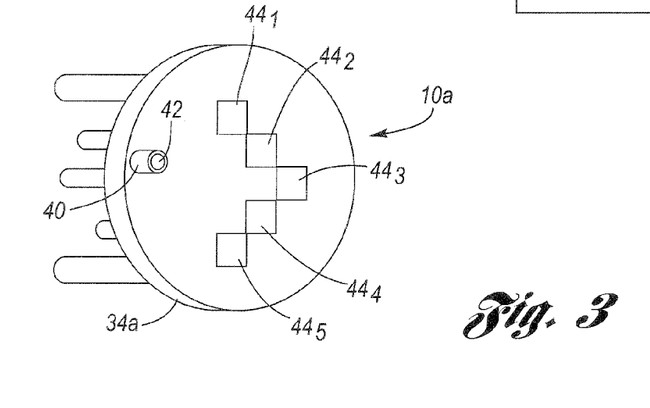
FIGS. 3-4 are plan views of a frame and cover, respectively, of a second embodiment of a fuel level sensor according to the present invention, using an array of photoelectric sensors protected in a sealed cavity.
Figure 4:
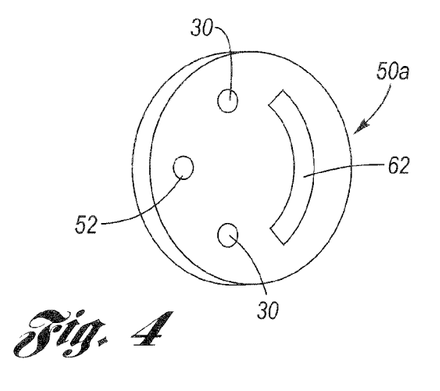

FIGS. 3-4 are plan views of a frame 34a and a cover 50a, respectively, of a second embodiment of a fuel level sensor 10a according to the present invention, where the light-responsive sensor includes a plurality of photoelectric sensors, designated $44_1$, $44_2$, $44_3$, $44_4$ and $44_5$. Sensors $44_1$, $44_2$, $44_3$, $44_4$ and $44_5$, disposed in sealed cavity 36 in the form of an array. The array is configured in shape to correspond to LED path 32, and is located in cavity 36 substantially directly below of and in registration with path 32. In operation, a maximum light intensity would move from sensor-to-sensor within the array as the LED 28 moves along path 32, as per changes in the fuel level. Logic/circuitry (e.g., circuit 46 or external circuit 16) may be provided that is configured to determine the position of LED 28 along path 32 in response to the respective outputs of sensors $44_1$, $44_2$, $44_3$, $44_4$ and $44_5$ in the array, as the maximum light intensity moves from sensor to sensor. Intermediate positions of the LED 28 along path 32 may be determined by evaluating the intensity levels detected by two or more sensors 44. In either instance, once a position of LED 28 along path 32 is determined, a corresponding float arm position and hence fuel level may be consequently determined. FIG. 4 shows an optional window 62 formed in cover 50. Window 62 may be configured to have a variable thickness from side to side in order to provide a variable amount of attenuation in order to control the amount of light reaching photoelectric sensors $44_1$, $44_2$, $44_3$, $44_4$ and $44_5$ in the array (or light intensity reaching any one of them).

Figure 5:
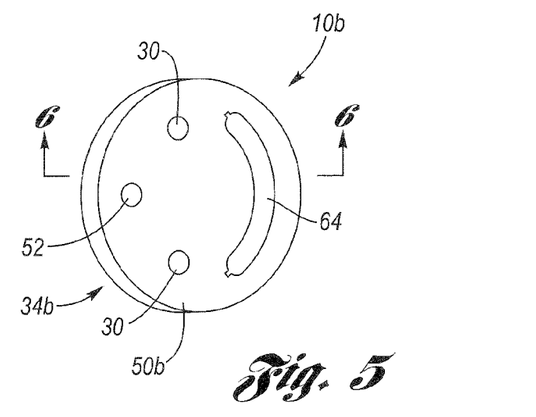
FIG. 5 is a perspective view of a third embodiment of a fuel level sensor according to the present invention, employing a light emitting diode (LED) guide channel.

FIG. 5 is a perspective view of a third embodiment of a fuel level sensor 10b according to the present invention, employing a light emitting diode (LED) guide channel 64, which is positioned in cover 50b so that when assembled to frame 34b, it is over the sensors $44_1$, $44_2$, $44_3$, $44_4$ and $44_5$ in cavity 36. In this embodiment, channel 64 is configured to enhance performance by allowing the LED 28 to travel in the channel 64, thus allowing the LED 28 to be closer to photoelectric sensor(s) $44_1$, $44_2$, $44_3$, $44_4$ and $44_5$ in the sealed cavity 36 by virtue of the guide channel 64 being recessed in cover 50b. This arrangement increases the amount of light and improves signal to noise. In the illustrated embodiment, guide channel 64 takes a shape that substantially corresponds to LED path 32.

Figure 6:
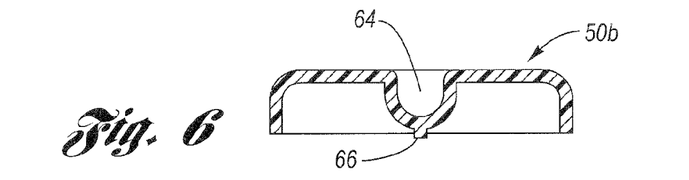
FIG. 6 is a cross-sectional view of the cover of the third embodiment taken substantially along lines 6-6 of FIG. 5.

FIG. 6 is a cross-sectional view of the cover 50b taken substantially along lines 6-6 of FIG. 5. Channel 64, in cross-section, is configured in size and shape to correspond to the size and shape of LED 28, which as illustrated is substantially U-shaped. Additionally, a light collecting/concentrating feature may be implemented by projection 64, which extends generally along the same path channel 64. The projection 64 is configured to better channel the light emitted from LED 28 towards sensors $44_1$, $44_2$, $44_3$, $44_4$ and $44_5$.

In a still further variation, to ameliorate the undesired effects of plastic discoloration of cover 50 (and any embodiment of cover 50), or if changing fuel quality becomes a concern, the present invention provides for a calibration feature. In this variation, one of the mechanical stops 30, for example the full position stop $30_{FULL}$, comprises an insert molded metal pin. It should be understood that while the "full" position is used as an example, all that is required is that the stop reflect a known, predetermined position of the float arm (and hence predetermined, known fuel level). In this regard, it also need not define a "stop" so long as contact is contemplated. When the fuel tank is "full", the float arm 24 is in the full fuel position and thus float arm 24 abuts and contacts the full position stop $30_{FULL}$ as described above. In this variation, since the mechanical stop $30_{FULL}$ and float arm 24 each comprise electrically conductive material, such contact can be detected by a circuit. For example, such contact can complete an electrical circuit, or otherwise alter the electrical characteristics of a reference circuit. One of ordinary skill in the art will recognize a variety of approaches for determining when such contact is made based on the metal-to-metal contact of float arm 24 and metal stop 30. Such a detection and calibration circuit (not shown) may be configured to detect when float arm 24 abuts the metal stop $30_{FULL}$ and to measure the output electrical signal of photoelectric sensor 44. The detection and calibration circuit may be further configured to then calibrate the measured fuel level signal (output signal of sensor 44) with the predetermined fuel level (e.g., the "full" fuel level in this example). This procedure for obtaining the maximum signal output from sensor 44 can be performed for each "full" fuel level detect, which is then set as the "full" value, with decreasing fuel level indications being based off of this reading as the output of the photoelectric sensor 44 decreases with fuel level.

Figures 7, 8:
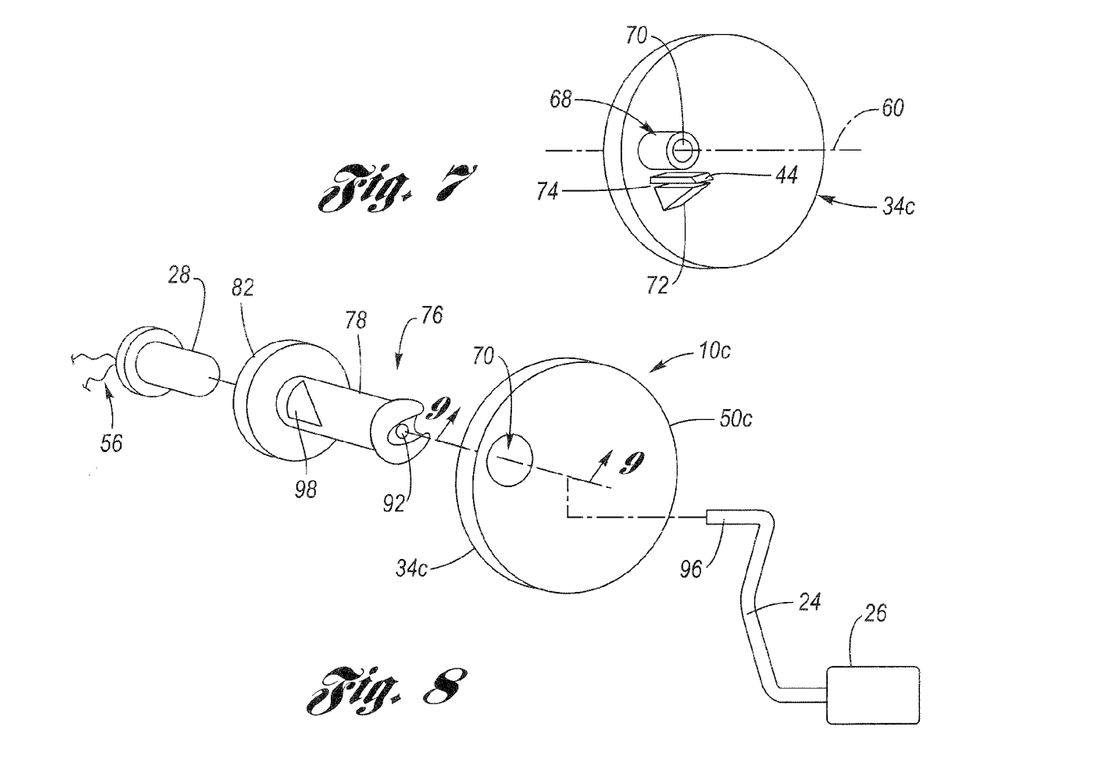
FIG. 7 is a perspective view of a frame of a fourth embodiment of a fuel level sensor according to the present invention, employing a novel rotating hub with a window to modulate light reaching the sensor.
FIG. 8 is an exploded perspective view of the embodiment of FIG. 7.

FIG. 7 is a perspective view of a frame 34c of a fourth embodiment of a fuel level sensor 10c according to the present invention. Frame 34c includes a boss 68 having a centrally-disposed through-bore 70, which may be the same structurally as described above in connection with boss 40/through-bore 42, except that boss 68/bore 70 in this embodiment comprises translucent plastic material. Frame 34c further includes a support 72 projecting from base wall 37 into cavity 36 towards cover 50c (best shown in FIG. 8). Support 72 includes a mounting surface 74 configured to support a light-responsive sensor, such as photoelectric sensor 44, disposed on surface 74 so that the light receptive portion of sensor 44 faces boss 68. Alternatively, boss 68 may be configured with a thin wall section (not shown) where the sensor 44 faces such thin wall section.

FIG. 8 is an exploded view of fuel level sensor 10c. Sensor 10c further includes a hub 76 configured to be disposed in through-bore 70.

Figure 9:
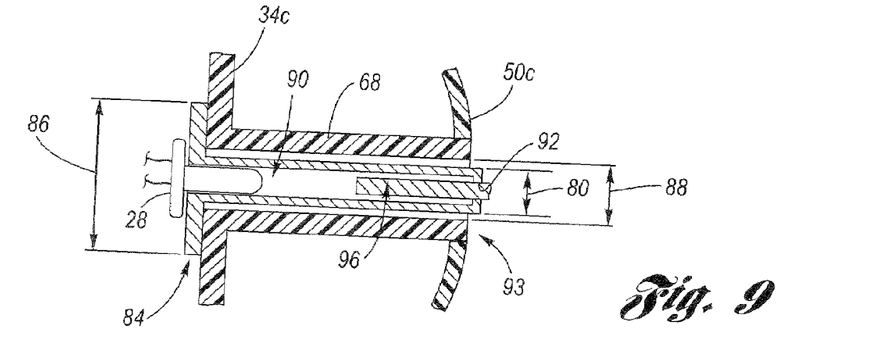
FIG. 9 is a cross-sectional view of an assembled fuel level sensor of the fourth embodiment taken substantially along lines 9-9 in FIG. 8.

FIG. 9 is a cross-sectional view of the assembled fuel level sensor 10c, taken substantially along lines 9-9 in FIG. 8.

Figure 10:
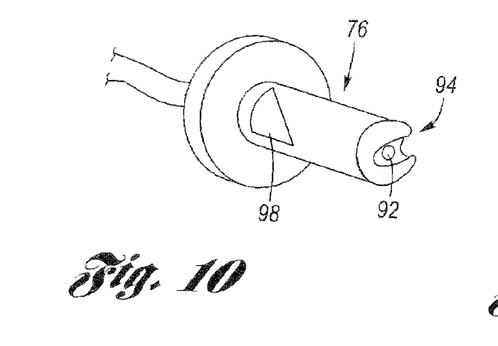
FIG. 10 is a perspective view of the hub of FIG. 8, showing a float arm keying feature in greater detail.

FIG. 10 is a perspective view showing hub 76 in greater detail.

With reference now to FIGS. 8-10, hub 76 has a main longitudinal axis and includes a main cylindrical body portion 78 with a first outside diameter 80. Hub 76 further includes a retaining flange 82 extending from cylindrical body portion 78 at a first axial end 84. The retaining flange 82 has second outside diameter 86. The through-bore 70 has a third diameter 88. The second diameter 86 (flange) is greater than third diameter 88 (through-bore) by an amount sufficient so as to retain hub 76 in through-bore 70. Hub 76 further includes a first, light-source recess 90 at first axial end 84 configured to receive a light source such as LED 28. This may be effected by a press-fit connection between the LED 28 and the light-source recess 90 so that the LED rotates with rotation of hub 76 in bore 70.

Hub 76 further includes a second recess 92 formed at a second end 93 that is axially opposite first axial end 84. Second recess 92 is characterized by a keying feature 94. Second recess 92 is configured to receive and retain a proximal portion 96 of float arm 24 such that the movement of the float arm causes rotation of the hub 76 in through-bore 70. In this embodiment, the foregoing may be implemented in a constructed embodiment by arranging the second recess 92 and the proximal portion 96 of float arm 24 for press-fit connection. The keying feature 94 is configured to fix an orientation of the float arm 24 with a predetermined angular position of hub 76.

Hub 76 further includes an opening or window 98 formed through an outer surface of cylindrical body portion 78 such that the opening is in light communication with the light-source recess 90 (containing LED 28). The opening 98 is configured in size and shape to vary an amount of light passing out of opening 98 and received by sensor 44 as a function of the rotational position of hub 76. In the illustrated embodiment, opening 98 is defined by a generally triangular shape. As hub 76 is rotated, the area of the triangle opening exposing light in a line-of-sight of sensor 44 will either increase or decrease, depending on the direction of rotation of hub 76—clockwise (CW) or counter-clockwise (CCW).

Thus, in construction, hub 76 fits into through-bore 70 from the rear of frame 34c. The retaining flange 82 acts as a limit as to how far the hub 76 can be inserted into the through-bore 70. The float arm 24 is then press-fit into the recess 92 of hub 76 from the opposite side (cover side) and is keyed into the proper angular orientation via keying feature 94. The LED 28 is also press-fit into the first, light-source recess 90 of hub 76. After insertion of the LED 28, the triangular shaped opening 98 is proximate the LED 28. As hub 76 rotates in accordance with movements of the float arm 24, the light intensity impinging on sensor 44 in the sealed cavity 36 changes, all based on the angular position of the hub 76 and thus also the opening 98 in relation to sensor 44 as described above. As a result, the electrical output signal of the sensor 44 also varies accordingly, and is representative of the level of fuel in the tank 12.

Figure 11:
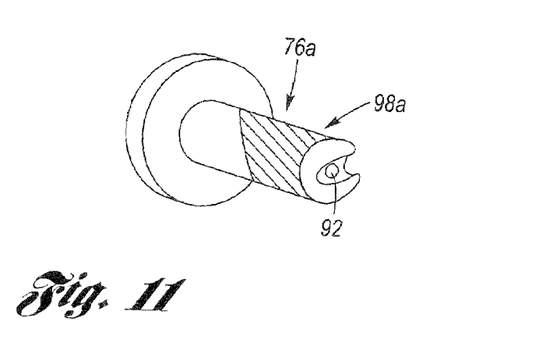
FIG. 11 is a perspective view of an alternative hub for use in the fourth embodiment of FIGS. 7-10.

FIG. 11 is a perspective view of a variation of the embodiment of FIGS. 7-10. In this variation, an alternative hub 76a includes a design 98a accomplishing the same light modulating effect, as a function of a rotation or angular position of hub 76 with opening 98. In this variation, a dark design or one varying in intensity is disposed on the body portion of the hub adjacent to LED 28 (i.e., in lieu of opening 98). As can be seen, the angular orientation of the dark design of the cylindrical body portion of hub 76a will modulate the light intensity emanating from hub 76a and received by sensor 44. Otherwise, the operation is the same as described above.

Figure 12:
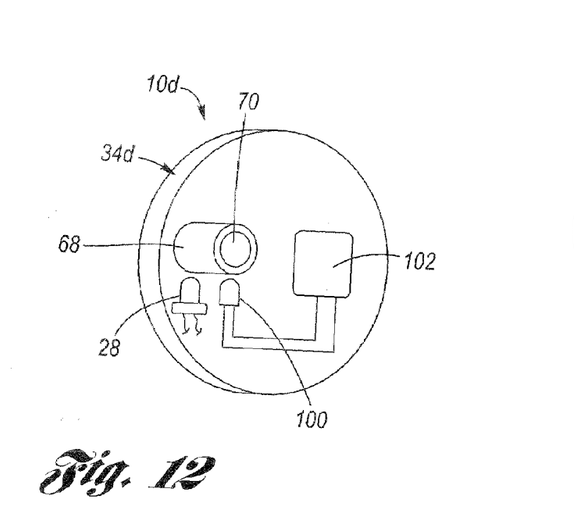
FIG. 12 is a perspective view of a fifth embodiment of a fuel level sensor according to the present invention, employing a CMOS sensing chip.
Figure 13:
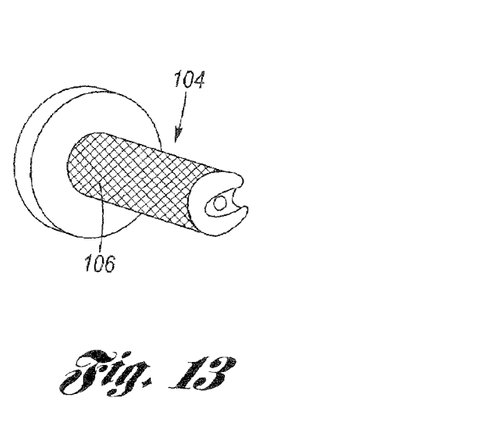
FIG. 13 is a perspective view of a hub suitable for use with the embodiment of FIG. 12 employing optical indexing indicia.

FIG. 12 is a perspective view of a frame 34d of a fifth embodiment of a fuel level sensor 10d according to the present invention. Disposed in the sealed cavity 36 of fuel level sensor 10d is a light transmissive boss 68/through-bore 70, as in the embodiment of FIGS. 7-11, but also further including a light source (such as LED 28), a CMOS sensor 100, and a processing chip 102. Additionally, a specially-configured hub 104 is provided which includes markings 106 that vary in a predefined manner when the hub is rotated angularly.

The LED 28 is arranged inside frame 34d such that the light emitted from LED 28 shines on the cylindrical-shaped boss 68, which is molded into frame 34d. CMOS sensor 100 is arranged so that an image acquisition portion (e.g., lens) that is light-responsive faces the cylindrical-shaped boss 68. Cylindrical shaped boss 68 comprises clear or translucent material having sufficient light transmission properties so as to allow the CMOS sensor 100 to image and distinguish the markings 106 (e.g. indexing indicia) molded into or otherwise applied to hub 104. In operation, the movement of float arm 24 causes hub 104 to rotate within through-bore 70. The CMOS sensor 100 is configured to "read" or otherwise pick up these markings 106, which are converted by processing circuit 102 into a corresponding signal indicative of hub rotation. The rotations of the hub can be tracked and a corresponding float arm position can be determined, for example, by either processing circuit 102 or by level circuit 16. The operation is generally similar to that of an optical mouse.

Figure 14:
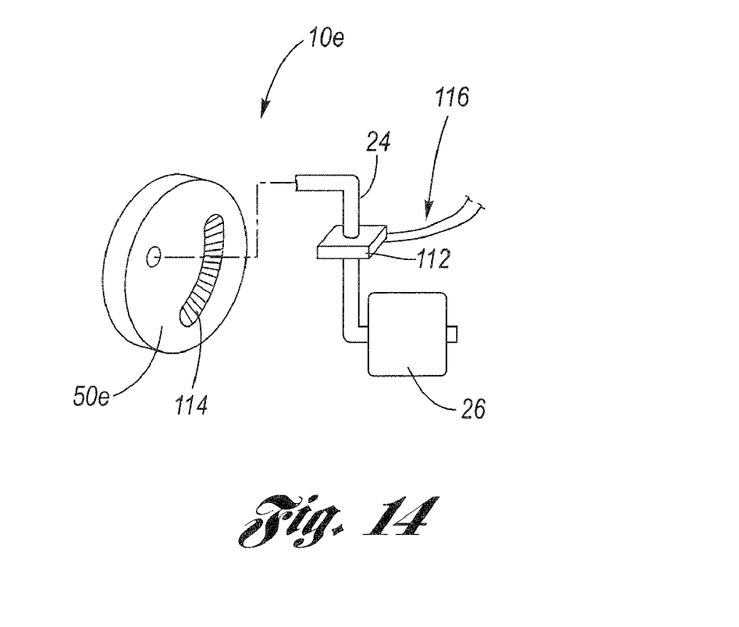
FIG. 14 is a perspective, partially exploded view of a sixth embodiment of a fuel level sensor according to the present invention, employing an digital displacement encoder.

FIG. 14 is a perspective, partially exploded view of a sixth embodiment of a fuel level sensor 10e according to the present invention. Fuel level sensor 10e employs an digital (optical) displacement encoder 112. In fuel level sensor 10e, the light-responsive sensor comprises an optical, digital displacement encoder 112 that is connected to float arm 24 for movement therewith along path 32 (path best shown in FIG. 1). Fuel level sensor 10e further includes indicia 114 placed on cover 50e corresponding to the shape, radius and distance of path 32 taken by encoder 112 as the float arm 24 moves. The indicia is configured to be read by displacement encoder 112, and may comprise a rotary scale applied as a tape or an adhesive-backed rotary scale. Displacement encoder 112 is coupled to an external circuit (e.g., level circuit 16) by way of leads 116, which provides the electrical signal indicative of the movement of the float arm. In operation, as the fuel level increases or decreases and the float 26 moves generally up and down, the float arm 24 is caused to move as well, in the manner described above. As the digital displacement encoder 112 is pivotally moved with the float arm 24, it reads the rotary scale 114 and generates a signal indicative of the rotational movement, which can be processed by level circuit 16 for translation to a fuel level signal indicative of a fuel level. Encoder 112 and rotary scale 114 may comprise conventional apparatus known to those of ordinary skill in the art, for example, a product line of encoders provided under the trade designation MERCURY II, available from MicroE Systems, Natick, Mass. 01760 USA.

In the embodiments described herein provide particular benefits over existing technology. The embodiments of the present invention comprise contactless sensors, which overcome the disadvantages attributable to wear found in conventional designs. Additionally, the sensitive components in general are sealed, protected from the influences of aggressive fuels.

While particular embodiments of the invention have been shown and described, numerous variations and alternate embodiments will occur to those skilled in the art. For example, the embodiments herein may be modified using a vertical float containing either the photoelectric sensor or the light source (LED), the CMOS sensor or the light source (LED), or the encoder or the linear scale (i.e., swapped light source/sensor orientations). The embodiments may also be modified to accommodate the wide variety of fuel reading sought and unique fuel tank sizes and shapes. Accordingly, it is intended that the invention be limited only in terms of the appended claims.

The invention claimed is:

1. A sealed fuel level sensor for a fuel tank comprising:
   a frame having a cavity therein;
   a cover connected to said frame to enclose said cavity;
   a float arm coupled to one of said frame and said cover;
   a float connected to said float arm and configured such that said float moves said float arm as a level of fuel increases and decreases in the fuel tank; and
   a light-responsive sensor configured to generate a fuel level signal indicative of a fuel level in the fuel tank based on the movement of said float arm;
   wherein said frame includes a boss projecting therefrom into said cavity towards said cover, said boss including a cylindrical through-bore having an axis, said boss comprising translucent material;
   said frame further includes a support projecting therefrom into said cavity towards said cover, said support including a mounting surface;
   a light source;
   said light-responsive sensor includes a photoelectric sensor disposed on said mounting surface so as to face said boss;
   said fuel level sensor further including a hub disposed in said through bore, said hub having a main cylindrical body portion with a first, outside diameter, said hub further having a retaining flange extending from said cylindrical body portion at a first end thereof, said retaining flange having a second, outside diameter greater than a third diameter of said cylindrical through-bore so as to retain said hub in said through bore, said hub having a first, light-source recess at said first end thereof configured to receive said light source, said hub further having a second recess formed at a second end thereof axially opposite said first end configured to receive and retain a proximal portion of said float arm such that said movement of said float arm causes rotation of said hub in said cylindrical bore;
   wherein said cylindrical body further includes an opening through an outer surface thereof in light communication with said light-source recess, said opening configured in size and shape to vary an amount of light passing out of said opening and into a line-of-sight to be received by said photoelectric sensor as a function of a rotational position of said hub.

2. The fuel level sensor of claim 1 wherein said light source comprises a light emitting diode (LED).

3. The fuel level sensor of claim 1 wherein said hub further includes a keying feature at said second end configured to establish an orientation of said float arm with a predetermined angular orientation of said hub.

4. The fuel level sensor of claim 1 wherein said opening has a triangular geometry.

5. A sealed fuel level sensor for a fuel tank comprising;
a frame having a cavity therein;
a cover connected to said frame to enclose said cavity;
a float arm coupled to one of said frame and said cover;
a float connected to said float arm and configured such that said float moves said float arm as a level of fuel increases and decreases in the fuel tank; and
a light-responsive sensor configured to generate a fuel level signal indicative of a fuel level in the fuel tank based on the movement of said float arm;
wherein said frame includes a boss projecting therefrom into said cavity towards said cover, said boss including a cylindrical through-bore having an axis, said boss comprising translucent material;
said fuel level sensor further comprises a light source disposed in said cavity configured to direct emitted light towards said translucent boss;
said light-responsive sensor comprises a CMOS sensor disposed in said cavity proximate to and facing said translucent boss;
said fuel level sensor further comprises a hub disposed in said through bore, said hub having a main cylindrical body portion with a first, outside diameter, said hub further having a retaining flange extending from cylindrical body portion at a first end thereof, said retaining flange having a second, outside diameter greater than a third diameter of said cylindrical through-bore so as to retain said hub in said through-bore, said hub further having a second recess formed at a second end thereof axially opposite said first end configured to receive and retain a proximal portion of said float arm such that said movement of said float arm causes rotation of said hub in said cylindrical bore; and
said cylindrical body further includes indicia on an outer surface thereof configured to interact with light from said light source to modulate light that is received by said CMOS sensor as said hub rotates, said CMOS sensor being configured to produce a corresponding signal indicative of said hub rotation.

6. The fuel level sensor of claim 5 wherein said light source comprises a light emitting diode (LED).

7. The fuel level sensor of claim 5 further including a processor electrically coupled to said CMOS sensor configured to process said signal from said CMOS sensor and produce said fuel level signal by correlating rotation of said hub with movement of said float arm.

* * * * *